United States Patent [19]
Wilson

[11] Patent Number: 4,804,256
[45] Date of Patent: Feb. 14, 1989

[54] FARADAY ROTATORS USING A MOVABLE OPTICAL ELEMENT

[76] Inventor: Donald K. Wilson, 102 Hillside Ave., Caldwell, N.J. 07006

[21] Appl. No.: 142,700

[22] Filed: Jan. 11, 1988

[51] Int. Cl.$^4$ ............................................. G02F 1/09
[52] U.S. Cl. .................................... 350/376; 350/392
[58] Field of Search .............. 350/374, 375, 376, 378, 350/399, 392, 389

[56] References Cited

U.S. PATENT DOCUMENTS

| | | | |
|---|---|---|---|
| 3,602,575 | 7/1969 | Young | 350/376 |
| 3,860,325 | 1/1975 | Matsushita | 350/378 |
| 4,033,670 | 7/1977 | Tanton et al. | 350/376 |
| 4,609,257 | 9/1986 | Shirasaki | 350/376 |

FOREIGN PATENT DOCUMENTS 55-76321  6/1980  Japan .................................... 350/376

Primary Examiner—Bruce Y. Arnold
Attorney, Agent, or Firm—J. N. Bain; R. J. Lillie

[57] ABSTRACT

A Faraday rotator comprising an optical element having an optical axis, a means for generating a magnetic field along the optical axis of the optical element in order to rotate a plane of polarization of polarized light about the optical axis, and a means for moving said optical element such that varying portions of the optical element can be enclosed over or withdrawn from the means for generating a magnetic field. In a preferred embodiment the optical element is held within a clamp contained within a movable screw which can be turned so as to vary the amount of the optical element surrounded by the means for generating the magnetic field.

10 Claims, 3 Drawing Sheets

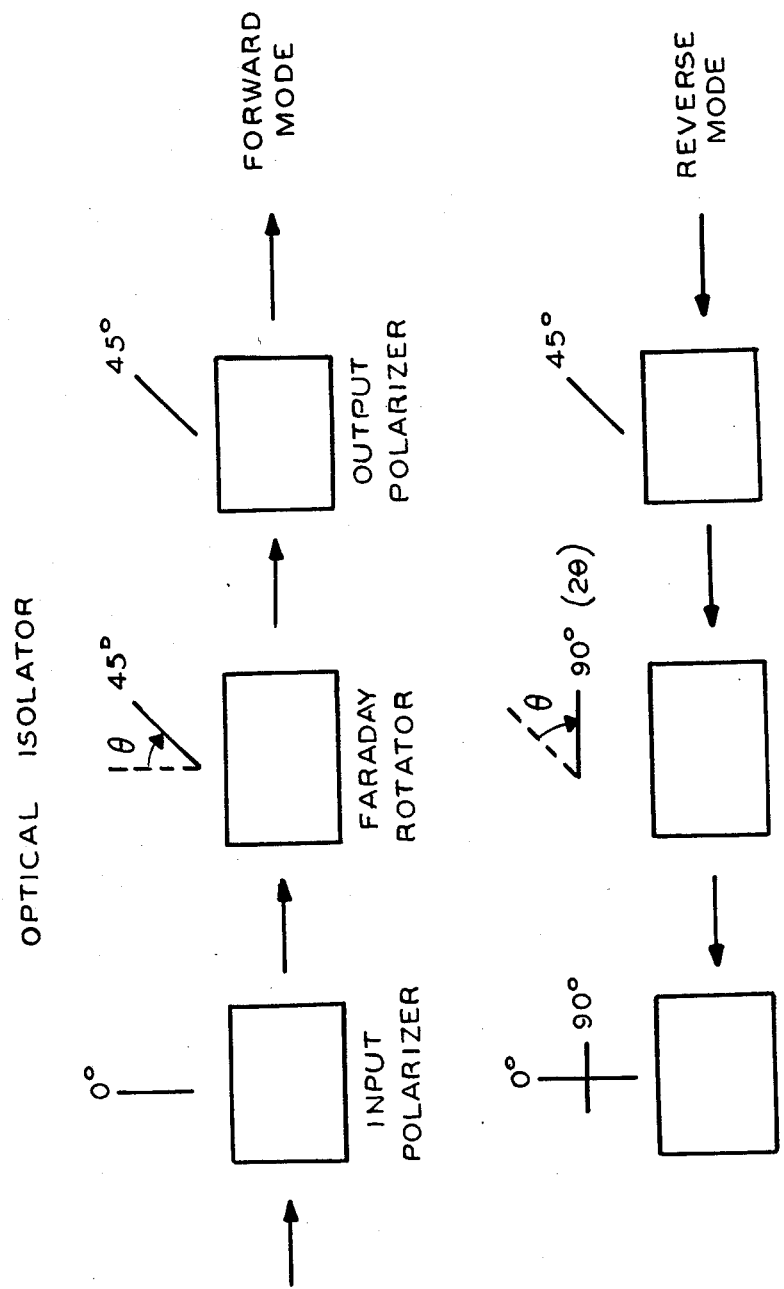

FARADAY ROTATORS USING A MOVABLE OPTICAL ELEMENT

This invention relates to optical isolators and Faraday rotators which rotate a plane of polarization of polarized light. More particularly, this invention relates to an optical element of a Faraday rotator which can be moved into or withdrawn from a means for generating a magnetic field about an optical axis of the optical element.

Optical isolators are devices which are used for operation with certain lasers or other light sources in the ultraviolet, visible, and infrared spectrums. An optical isolator permits the transmission of that light. An optical isolator is especially useful when used in conjunction with a laser in that it prevents optical feedback into the laser. This feedback is analogous to electronic feedback.

The optical isolator works by rotating the plane of polarization of polarized light as the polarized light passes through a medium known as an optical element. The optical element is contained within a means for generating a magnetic field along the optical axis of said optical element. The optical element is made of an optically transmitting material having a Verdet constant. The Verdet constant is a measure of the ability of a material to rotate the plane of polarization of polarized light. The optical element and the means for generating a magnetic field along the optical axis of the optical element is known as a Faraday Rotator. An example of the means for generating the magnetic field for the Faraday rotator is a donut-shaped magnet which has a hole for containing the optical element.

An optical isolator is comprised of an input polarizer, followed by the Faraday rotator, followed by an output polarizer. These three elements are all contained in a body.

Light emitted from a source enters an input polarizer. The light waves entering the input polarizer enter from one direction. The input polarizer causes the light to be linearly polarized. In this way, a plane of polarization of polarized light is formed. The polarized light then enters the optical element of the Faraday rotator, the optical element being surrounded by a means for generating a magnetic field such as a permanent magnet or an electromagnet. The generation of a magnetic field along the optical axis of traveling light contained in the optical element rotates the plane of polarization of polarized light to a desired angle of rotation $\theta$. Light exiting the the Faraday rotator, its plane of polarization having been rotated, enters an output polarizer. The output polarizer has a plane of polarization parallel to the plane of polarization of the light which exited the Faraday rotator. The light then exits the output polarizer and enters into a system or begins its intended use. A series of reflections of the polarized light may then occur. Some of the light is reflected back toward the original source, now traveling in the reverse direction at random polarization.

The reflected polarized light, traveling in the reverse direction at random polarization, re-enters the output polarizer, wherein the reflected light is polarized in a plane of polarization having an angle of rotation $\theta$. The reflected polarized light then exits the output polarizer and re-enters the Faraday rotator in the reverse direction.

The reflected polarized light, traveling in the reverse direction and having a plane of polarization at an angle of rotatation $\theta$, has its plane of polarization rotated again by a desired angle of rotation $\theta$, thus resulting in a total angle of rotation $2\theta$. The reflected polarized light then exits the Faraday rotator and re-enters the input polarizer.

When the reflected polarized light, which enters the input polarizer in the reverse direction, has a total angle of rotation $2\theta$ of the plane of polarization which equals 90°, extinction or maximum isolation of the reflected polarized light occurs in the input polarizer. In this way, optical feedback of the reflected polarized light to the light source is prevented.

Applicant has invented a Faraday rotator and an optical isolator which are adapted so as to insure optimal rotation of the plane of polarization of polarized light. Applicant's invention is directed to a Faraday rotator comprising an optical element in which is rotated a plane of polarization of polarized light along an optical axis of the optical element, said optical element being made of an optically transmitting material. The Faraday rotator also comprises an immobile means for generating a magnetic field along the optical axis of the optical element, thereby rotating a plane of polarization of polarized light about the optical axis of the optical element. The Faraday rotator also comprises means for moving the optical element such that the optical element is capable of having at least a portion of the optical element being enclosed over or withdrawn from said immobile means for generating a magnetic field about the optical element. The means for moving the optical element may comprise a clamp for holding a portion of the optical element, and a screw which has an externally threaded portion and an internal portion for receiving the clamp. This means also includes a nut which is immobile and has an internal threaded portion for engaging the external threaded portion of the screw.

The means for generating a magnetic field may be a permanent magnet or an electromagnet.

Applicant's invention is also directed to an optical isolator containing the Faraday rotator of Applicant's invention. The optical isolator also includes an input polarizer for polarizing waves or beams of light, and an output polarizer. The optical isolator may further comprise a barrel means for surrounding the means for generating a magnetic field. The barrel means is contiguous with the nut, which, as stated above, is part of the above-mentioned means for moving the optical element. A saddle means may be located beneath the barrel means. The saddle means and barrel means are capable of receiving bolting means. A cap means may be contiguous to the barrel means at an end of the barrel means opposite the end contiguous with the nut. The cap means and nut render the means for generating a magnetic field immobile. The optical isolator may, in addition, include a bracket means which is capable of clamping engagement with the output polarizer, and is located adjacent to the saddle means. Applicant's invention is also directed to a method of rotating the plane of polarization of polarized light by using the Faraday rotator or optical isolator of Applicant's invention. The Faraday rotator and optical isolator of Applicant's invention possesses an advantage over Faraday rotators and optical isolators of the prior art in that the optical element of the Faraday rotator can be moved into or withdrawn from the surrounding means for generating a magnetic field. The length of optical element that is surrounded by the magnetic field is therefore adjustable. This is an advantage because the angle of rotation of the plane of polarization of polarized light is dependent on the wavelength of the light which is passing through the optical isolator. By adjusting the length of the optical element that is exposed to the magnetic field, one is able to tune the Faraday rotator so that the plane of polarization of polarized light is rotated by an optimum angle of rotation. This, therefore, enables the Faraday rotator and optical isolator of Applicant's invention to accommodate the passage of a broad variety of wavelengths of light.

The invention will now be described with respect to the drawings, wherein:

FIG. 4 is a block diagram of light traveling through an optical isolator.

Figure 1:
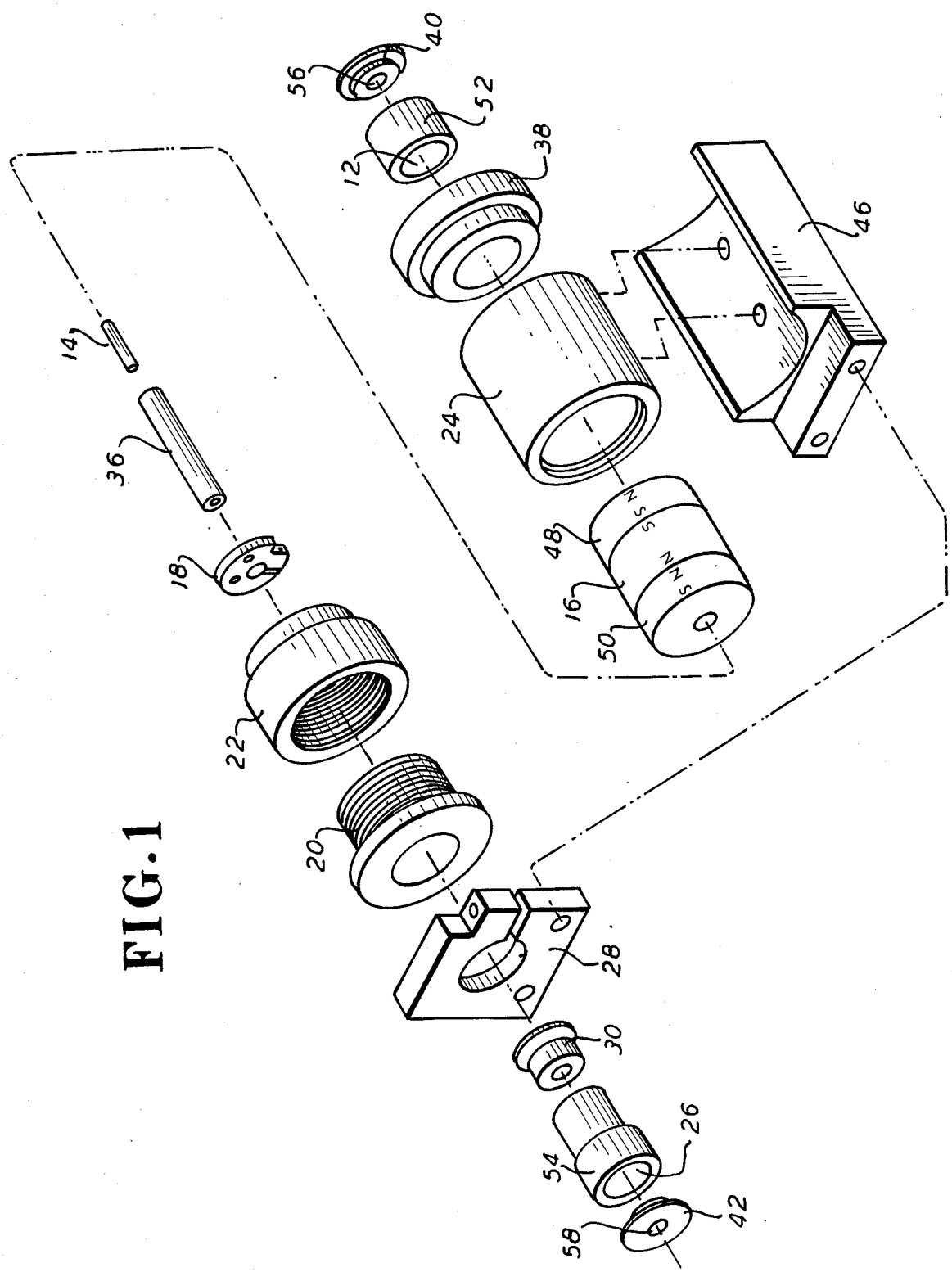
FIG. 1 is an exploded view of an embodiment of an optical isolator and Faraday rotator of the present invention.
Figure 2:
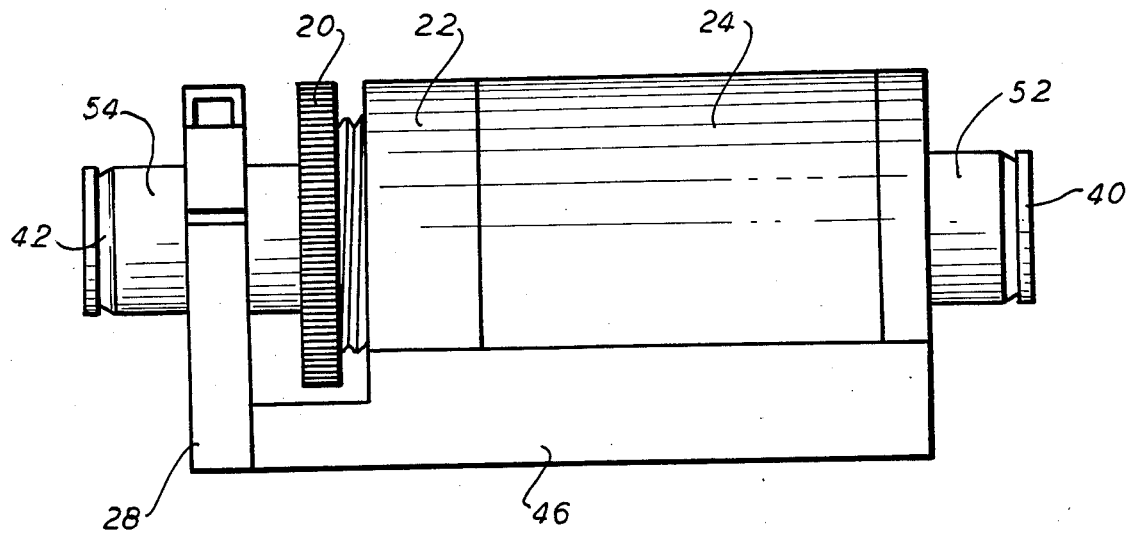
FIG. 2 is a side view of an embodiment of an optical isolator of the present invention.
Figure 3:
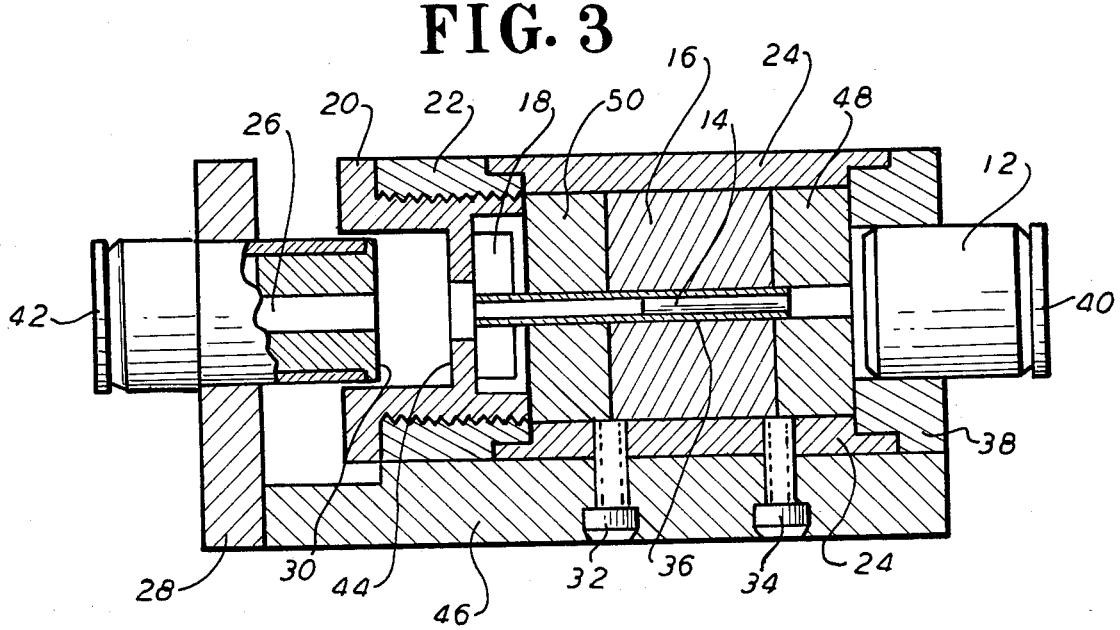
FIG. 3 is a cross-section of an embodiment of an optical isolator and Faraday rotator of the present invention.

Referring now to the drawings, light emitted from a light source, for example, a laser, travels from the light source in one direction to the input polarizer 12 of the optical isolator 10. The input polarizer 12 is contained within a barrel 52 and input polarizer 12 and barrel 52 have a cover 40. Cover 40 has a central opening 56 that allows light to enter input polarizer 12. The barrel 52 may also rest within a cap 38. The input polarizer 12 causes the light waves or beams to become linearly polarized, thus creating a plane of polarization of polarized light. The polarized light then exits the input polarizer 12 and enters the optical element 14 of the Faraday rotator along an optical axis.

Surrounding the optical element 14 of the Faraday rotator is a magnet 16, which preferably is a donut-shaped magnet which surrounds the optical element 14. Optionally, a tube 36 made of a non-magnetic material such as brass or plastic is disposed between optical element 14 and magnet 16. Magnet 16 is immobile and is surrounded by barrel 24, which rests upon saddle 46. Screws 32 and 34 are inserted through saddle 46 and barrel 24. Located at opposite ends of and contiguous with barrel 24 are nut 22 and cap 38. Nut 22 and cap 38 keep magnet 16 retained within barrel 24 and keep magnet 16 immobile. Optional tuning magnets 48 and 50 may be located at each end of magnet 16. Each of these tuning magnets 48 and 50 may generate a magnetic field in a direction opposite to the direction of generation of the magnetic field generated by magnet 16. Alternatively, each of the tuning magnets 48 and 50 may generate a magnetic field in a direction perpendicular to the direction of generation of the magnetic field generated by magnet 16.

One end of optical element 14, which may be contained within tube 36, is disposed within clamp 18. Clamp 18 is disposed and held within flanged screw 20, which is externally threaded. The externally threaded portion of flanged screw 20 is in screwing engagement with the internally threaded portion of nut 22. Nut 22 is immobile and abuts against and is contiguous with barrel 24. Flanged screw 20 has a recessed portion 44 which mates with backstop 30. By turning flanged screw 20 within nut 22, one can thereby adjust the length of optical element 14 which remains surrounded by magnet 16. In this way, the Faraday rotator and optical isolator 10 are tuned so that the plane of polarization of polarized light that enters optical element 14 is rotated by a desired angle of rotation $\theta$. The length of the optical element 14 which remains surrounded by magnet 16 depends on the wavelengths of light which is transmitted by the light source. The tuning of the Faraday rotator occurs before one transmits light from the light source.

The optical element 14 is made of an optically transmitting material. Preferred materials are zinc selenide, zinc sulfide, and doped cadmium telluride materials such as cadmium-manganese-telluride, and arsenic trisulfide.

When the polarized light enters optical element 14 of the Faraday rotator, it is traveling along an optical axis. A magnetic field generated by magnet 16 rotates the plane of polarization of the polarized light by a desired angle of rotation $\theta$. As depicted in FIG. 4, the desired angle of rotation in the embodiment shown is 45 degrees. The polarized light, thus having its plane of polarization rotated by a desired angle of rotation $\theta$, or 45 degrees, exits the optical element 14 of the Faraday rotator and enters the output polarizer 26.

Adjacent to the output polarizer 26 is backstop 30. Backstop 30 is capable of mating with recess 44 of screw 20 within nut 22. Backstop 30 is constructed such that is does not impede the passage of polarized light to output polarizer 26.

Output polarizer 26 is disposed within a barrel 54 which is held within clamping bracket 28. Clamping bracket 28 is capable of holding barrel 54 and output polarizer 26 in such a position so that the output polarizer 26 has a plane of polarization which is parallel to the plane of polarization of the polarized light which exits the Faraday rotator. A cover 42 is located at the end of the output polarizer 26 and barrel 54 which is opposite backstop 30. Cover 42 has a central opening 58 which allows light to exit output polarizer 26.

Output polarizer 26, as stated above, has a plane of polarization parallel to the plane of polarization of the polarized light which exited the Faraday rotator. Light which exits output polarizer 26 enters into a system or begins its intended use. A series of reflections of the polarized light may then occur. Some of the light is reflected back toward the original source. This light then travels in the reverse direction at random polarization.

In the reverse mode, the reflected polarized light, which may be of random polarization, re-enters the output polarizer 26. Output polarizer 26 polarizes the reflected polarized light in a plane of the polarization having an angle of rotation $\theta$. The reflected polarized light then exits output polarizer 26 and re-enters the optical element 14 of the Faraday rotator. The reflected polarized light, which has a plane of polarization of an angle of rotation of 45 degrees. now has its plane of polarization rotated another 45 degrees while traveling in the reverse mode, thus making the total angle of rotation $2\theta$, or 90 degrees with respect to input polarizer 12. The reflected polarized light then exits optical element 14 of the Faraday rotator and re-enters the input polarizer 12 in the reverse direction.

In the input polarizer 12, the light which has traveled in the reverse mode, with a plane of polarization at an angle of rotation of 90 degrees becomes extinct or maximally isolated. In this way, optical feedback of the reflected polarized light to the light source is thereby prevented.

In some embodiments the plane of polarization of the polarized light may not be rotated by the optical element in the Faraday rotator at an angle of 45 degrees during each pass of the light through the optical element of the Faraday rotator. In these cases, the polarized light traveling in the reverse mode wil have a plane of polarization that has not been rotated for a total angle of rotation that is 90 degrees. Because of this, there will be some feedback to the light source but not as much as if there were no optical isolator present next to the light source.

As mentioned above, however, an advantage of the present invention is that the optical element 14 can be moved in and out of magnet 16, so that the portion of optical element 14 that remains surrounded by magnet 16 can vary. The angle of rotation of the plane of polarization of polarized light is dependent upon the wavelength of the light emitted by the light source. If the optical element remains fixed, the plane of polarization of polarized light may not be rotated for an angle of rotation of exactly 45 degrees with light waves of varying wavelengths. With Applicant's invention, however, the amount of optical element 14 which remains surrounded by magnet 16 can be varied so that the optical element 14 can be adjusted to various wavelengths of light in order to rotate the plane of polarization of the polarized light by 45 degrees or any other desired angle of rotation if necessary.

It is understood that the scope of the present invention is not to be limited to specific embodiments described above. The invention may be practiced other than as particularly described and still be within the scope of the accompanying claims.

What is claimed is;

1. A Faraday rotator comprising:
   an optical element in which is rotated a plane of polarization of polarized light about an optical axis of said optical element, said optical element being made of an optically transmitting material;
   an immobile means for generating a magnetic field along the optical axis of said optical element, thereby rotating a plane of polarization of polarized light about the optical axis of said optical element; and
   means for moving said optical element such that said optical element is capable of having at least a portion of said optical element being enclosed over by or withdrawn from said immobile means for generating a magnetic field about the optical element.

2. The Faraday rotator of claim 1 wherein said means for moving said optical element comprises:
   a clamp for holding a portion of said optical element;
   a screw, said screw having an externally threaded portion and an internal portion for receiving said clamp; and
   a nut, said nut being immobile and having an internal threaded portion for engaging wth the external threaded portion of said screw.

3. The Faraday rotator of claim 1 wherein said means for generating a magnetic field comprises a permanent magnet.

4. The Faraday rotator of claim 1 wherein said means for generating a magnetic field comprises an electromagnet.

5. An optical isolator comprising:
   an input polarizer for polarizing waves or beams of light;
   a Faraday rotator for rotating a plane of polarization of polarized light, said Faraday rotator comprising:
   an optical element in whch is rotated a plane of polarization of polarized light about an optical axis of said optical element, said optical element being made of an optically transmitting material;
   an immobile means for generating a magnetic field along the optical axis of said optical element, thereby rotating a plane of polarization of polarized light about the optical axis of said optical element; and
   means for moving said optical element such that said optical element is capable of having at least a portion of said optical element being enclosed over by or withdrawn from said immobile means for generating a magnetic field about the optical axis of said optical element; and
   an output polarizer.

6. The optical isolator of claim 5 wherein said means for moving said optical element comprises:
   a clamp for holding a portion of said optical element;
   a screw, said screw having an externally threaded portion and an internal portion for receiving said clamp; and
   a nut, said nut being immobile and having an internal threaded portion for engaging the external threaded portion of said screw.

7. The optical isolator of claim 6, and further comprising:
   a barrel means surrounding said immobile means for generating a magnetic field, said barrel means being contiguous with said nut;
   a saddle means located beneath said barrel means, said saddle means and said barrel means being capable of receiving bolting means; and a cap means contiguous with said barrel means at an end of said barrel means opposite the end of said barrel means contiguous with said nut, said nut and said cap means rendering said means for generating a magnetic field immobile.

8. The optical isolator of claim 7, and further comprising;
   a bracket means, said bracket capable of clamping engagement with said output polarizer, said bracket being adjacent to said saddle means.

9. The optical isolator of claim 5 wherein said means for generating a magnetic field comprises a permanent magnet.

10. The optical isolator of claim 5 wherein said means for generating a magnetic field comprises an electromagnet.

* * * * *